(12) United States Patent
Fujiune

(10) Patent No.: US 10,447,979 B2
(45) Date of Patent: *Oct. 15, 2019

(54) PROJECTION DEVICE FOR DETECTING AND RECOGNIZING MOVING OBJECTS

(71) Applicant: Panasonic Intellectual Property Management Co., Ltd., Osaka (JP)

(72) Inventor: Kenji Fujiune, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,417

(22) Filed: Nov. 23, 2015

(65) Prior Publication Data

US 2016/0191868 A1    Jun. 30, 2016

(30) Foreign Application Priority Data

Dec. 25, 2014  (JP) .................. 2014-263633
Oct. 27, 2015  (JP) .................. 2015-210321

(51) Int. Cl.
| | |
|---|---|
| *H04N 9/31* | (2006.01) |
| *G03B 21/14* | (2006.01) |
| *G09G 3/00* | (2006.01) |
| *G03B 17/54* | (2006.01) |

(52) U.S. Cl.
CPC ............ *H04N 9/315* (2013.01); *G03B 17/54* (2013.01); *G03B 21/145* (2013.01); *G09G 3/002* (2013.01); *H04N 9/317* (2013.01); *H04N 9/3179* (2013.01); *H04N 9/3185* (2013.01); *H04N 9/3188* (2013.01); *H04N 9/3194* (2013.01); *G09G 2354/00* (2013.01)

(58) Field of Classification Search
CPC ....................... H04N 9/317; G09G 2320/0261
USPC .................................................. 348/744, 759
See application file for complete search history.

(56) References Cited

U.S. PATENT DOCUMENTS 6,522,386 B1 * 2/2003 Nishi .................. G03F 7/70241
355/52
6,570,954 B2 * 5/2003 Rasche ................ A61B 6/0457
378/21

(Continued)

FOREIGN PATENT DOCUMENTS

JP    60211433 A  * 10/1985
JP    9-149296       6/1997

(Continued)

*Primary Examiner* — Paulos M Natnael
(74) *Attorney, Agent, or Firm* — Wenderoth, Lind & Ponack, L.L.P.

(57) ABSTRACT

A projection device includes a detection unit configured to detect a specific object, a projection unit configured to project a projection image indicated by a video signal, a drive unit configured to change the direction of the projection unit so as to change a projection position of the projection image, and a controller configured to control the drive unit. The controller controls the drive unit such that the drive unit performs a first control in which the projection image is projected at a position following the motion of the specific object detected by the detection unit and a second control in which the projection position of the projection image is changed according to the video signal.

10 Claims, 12 Drawing Sheets

(56) References Cited

U.S. PATENT DOCUMENTS

| | | | | |
|---|---|---|---|---|
| 7,102,618 | B2* | 9/2006 | Nishiumi | A63F 13/02 345/161 |
| 7,185,986 | B2* | 3/2007 | Taoka | H04N 5/7416 348/756 |
| 7,664,598 | B2* | 2/2010 | Yamamoto | G01C 21/005 340/995.22 |
| 8,666,519 | B1* | 3/2014 | Bergeron | G09B 9/02 463/47 |
| 9,588,408 | B1* | 3/2017 | Linnell | G03B 21/14 |
| 10,122,976 | B2* | 11/2018 | Fujiune | G03B 21/145 |
| 2002/0051057 | A1 | 5/2002 | Yata | |
| 2005/0036075 | A1* | 2/2005 | Taoka | H04N 5/7416 348/761 |
| 2006/0187421 | A1* | 8/2006 | Hattori | H04N 5/74 353/69 |
| 2008/0118126 | A1* | 5/2008 | Sakaguchi | A61B 6/032 382/128 |
| 2009/0027571 | A1* | 1/2009 | Amano | H04N 9/3185 348/744 |
| 2009/0207322 | A1* | 8/2009 | Mizuuchi | G03B 21/14 348/745 |
| 2009/0284714 | A1* | 11/2009 | Kogo | H04N 9/3194 353/48 |
| 2010/0238296 | A1 | 9/2010 | Nakamura | |
| 2011/0058109 | A1* | 3/2011 | Nishigaki | G06F 3/0425 348/744 |
| 2011/0205497 | A1* | 8/2011 | Wakabayashi | G02B 26/101 353/28 |
| 2011/0249241 | A1 | 10/2011 | Wakabayashi | |
| 2012/0133837 | A1 | 5/2012 | Furukawa | |
| 2013/0083072 | A1 | 4/2013 | Yoshino | |
| 2013/0100009 | A1* | 4/2013 | Willis | H04N 9/3147 345/156 |
| 2013/0249790 | A1* | 9/2013 | Takasu | G06F 3/017 345/156 |
| 2014/0240681 | A1* | 8/2014 | Izukawa | G06F 3/0423 353/85 |
| 2015/0009100 | A1* | 1/2015 | Haneda | B60R 1/00 345/7 |
| 2015/0317835 | A1* | 11/2015 | Byers | H04L 65/1083 345/633 |
| 2015/0379494 | A1* | 12/2015 | Hiroi | G01B 11/002 705/16 |

FOREIGN PATENT DOCUMENTS

| | | | |
|---|---|---|---|
| JP | 2002-135766 | | 5/2002 |
| JP | 2002253542 | A * | 9/2002 |
| JP | 2005-115270 | | 4/2005 |
| JP | 2010-219942 | | 9/2010 |
| JP | 2011-221214 | | 11/2011 |
| JP | 2012-118121 | | 6/2012 |
| JP | 2012-169903 | | 9/2012 |
| JP | 2013-076924 | | 4/2013 |

* cited by examiner

PROJECTION DEVICE FOR DETECTING AND RECOGNIZING MOVING OBJECTS

BACKGROUND

1. Technical Field

The present disclosure relates to a projection device that detects a predetermined object, and projects an image by following the detected object.

2. Description of the Related Art

Recently, an advertising method (digital signage) using a display device such as a liquid crystal display device or a projector has been widespread as a method of sending information, such as an advertisement or guidance, to a moving person. Further, a liquid crystal display device that detects moving persons, and displays information for each of the detected persons has been studied and developed (e.g., Unexamined Japanese Patent Publication No. 2005-115270, Unexamined Japanese Patent Publication No. 2012-118121, etc.)

Unexamined Japanese Patent Publication No. 2005-115270 discloses a moving body attached information display device including a video camera that images a moving body passing a background defined within a fixed frame on a wall surface or on a floor surface, an image processor which sequentially extracts position coordinates of the moving body entering the current image sequentially imaged by the video camera, calculates position coordinates for display away from the respective position coordinates on the basis of the respective position coordinates, and sequentially inserts information of a text, an image, etc., into the respective position coordinates for display in a prescribed display size to output the result as video information, and a video display device having a display screen on the wall surface or floor surface, and displaying the video information of the text, image, etc. of prescribed display size on the display screen according to the movement of the moving body. This video image display device can recognize moving objects (e.g., persons) with a video camera, and display information for each of the recognized moving objects.

SUMMARY

A projection device according to the present disclosure includes: a detection unit configured to detect a specific object; a projection unit configured to project a projection image indicated by a video signal; a drive unit configured to change a direction of the projection unit so as to change a projection position of the projection image; a controller configured to control the drive unit such that the drive unit performs a first control in which the projection image is projected at a position following a motion of the specific object detected by the detection unit and a second control in which a projection position of the projection image is changed according to the video signal.

DETAILED DESCRIPTION

Note that the accompanying drawings and the following description are provided by the inventor of the present disclosure in order for a person of ordinary skill in the art to sufficiently understand the present disclosure, and they are not intended to limit the subject matter set forth in the claims.

Exemplary embodiments will be described in detail below with reference to the drawings as necessary. However, more than necessary detailed descriptions will sometimes be omitted. For example, detailed descriptions for matters which have already been well known in the art and redundant descriptions for substantially the same configurations will sometimes be omitted. This is to prevent the description below from becoming unnecessarily redundant to facilitate understanding of a person skilled in the art.

Note that the accompanying drawings and the following description are provided by the applicant in order for a person of ordinary skill in the art to sufficiently understand the present disclosure, and they are not intended to limit the subject matter set forth in the claims.

First Exemplary Embodiment

A first exemplary embodiment will be described below with reference to the accompanying drawings. In the description below, a projector device will be described as a specific exemplary embodiment of a projection device according to the present disclosure.

[1-1. Brief Summary]

Figure 1:
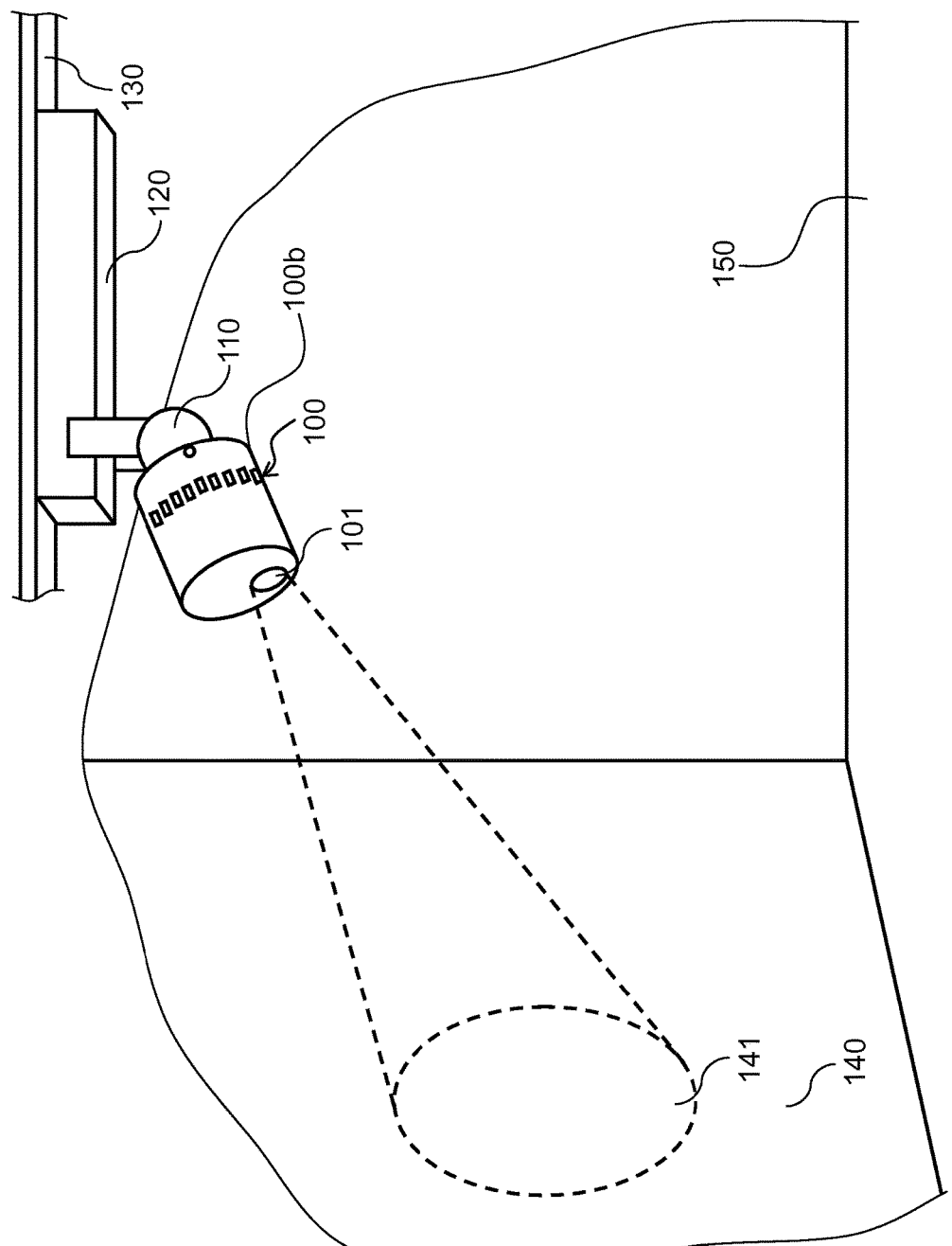
FIG. 1 is a schematic diagram illustrating a state in which a projector device projects an image onto a wall surface.
Figure 2:
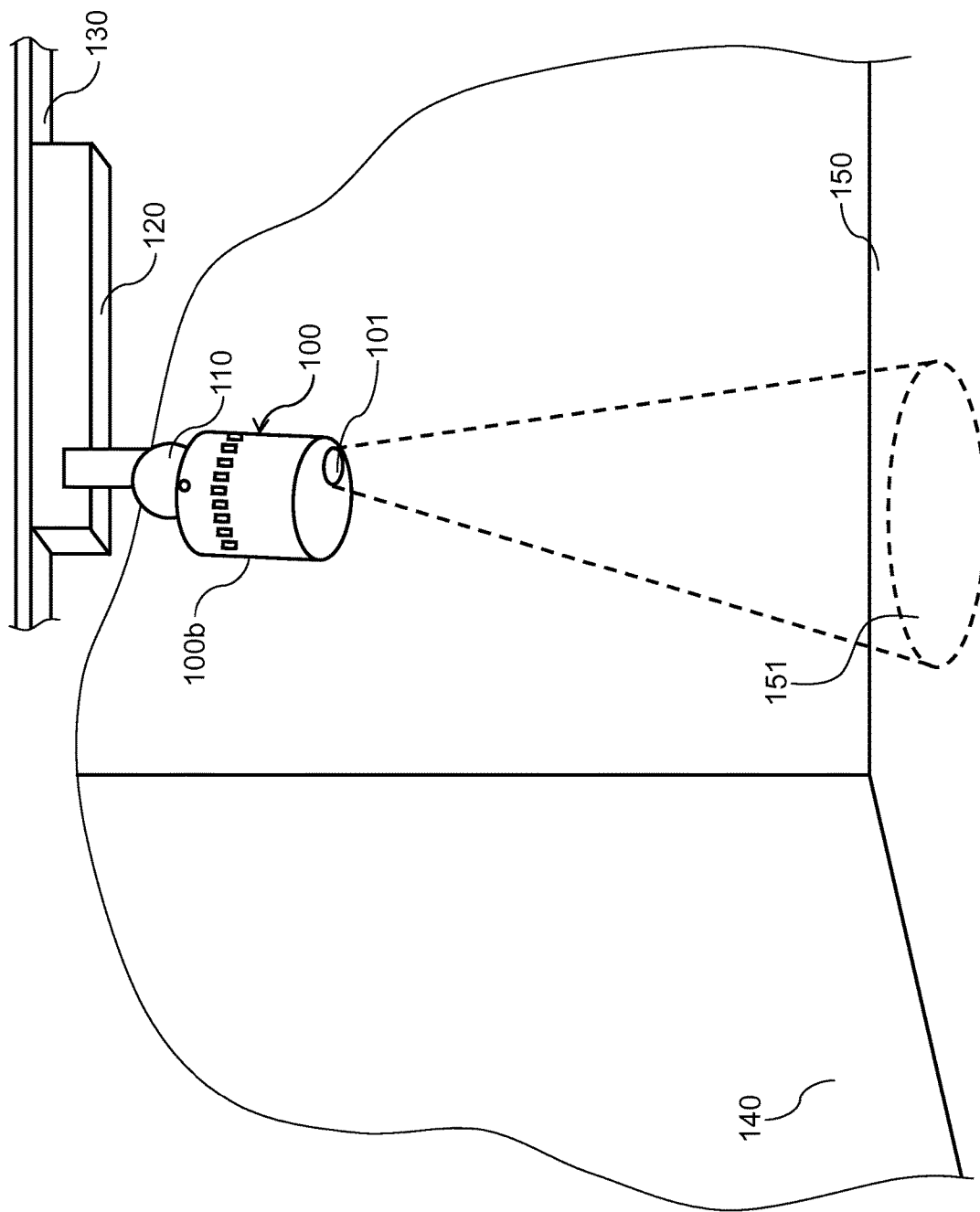
FIG. 2 is a schematic diagram illustrating a state in which the projector device projects an image onto a floor surface.

A brief image projection operation with projector device 100 will be described with reference to FIGS. 1 and 2. FIG. 1 is a conceptual diagram illustrating that projector device 100 projects an image onto wall 140. FIG. 2 is a conceptual diagram illustrating that projector device 100 projects an image onto floor surface 150.

As illustrated in FIGS. 1 and 2, projector device 100 is fixed to housing 120 with drive unit 110. Wiring lines electrically connected to projector body 100*b* and respective units composing drive unit 110 are connected to a power source via housing 120 and wiring duct 130. With this, electric power is supplied to projector body 100b and drive unit 110. Projector device 100 has opening 101 on projector body 100b. Projector device 100 projects an image through opening 101.

Drive unit 110 drives projector device 100 to change the direction of projector body 100b, thereby being capable of changing a projection direction of projector device 100. As illustrated in FIG. 1, drive unit 110 can drive projector device 100 such that the projection direction of projector device 100 matches a direction toward wall 140. Thus, projector device 100 can project image 141 on wall 140. Similarly, as illustrated in FIG. 2, drive unit 110 can drive projector device 100 such that the projection direction of projector device 100 matches a direction toward floor surface 150. Thus, projector device 100 can project image 151 on floor surface 150. Drive unit 110 may drive projector device 100 based on a user's manual operation or automatically drive projector device 100 according to a detection result of a predetermined sensor. Image 141 which is to be projected on wall 140 and image 151 which is to be projected on floor surface 150 may be different from each other or the same as each other. Drive unit 110 includes an electric motor, and can change the direction (orientation) of projector device 100 to change the projection direction or projection position of the image by swinging projector body 100b in a horizontal direction (pan direction) and vertical direction (tilt direction).

Projector device 100 can detect a specific object, and project an image (contents) at a position or in a region having a predetermined positional relation based on the position of the specified object by following the motion of the detected object. Notably, in the following description, a "person" is detected as the specific object, and a control for projecting an image by following a motion of a detected person is referred to as a "person following control".

[1-2. Configuration]

The configuration and operation of projector device 100 will be described in detail below.

Figure 3:
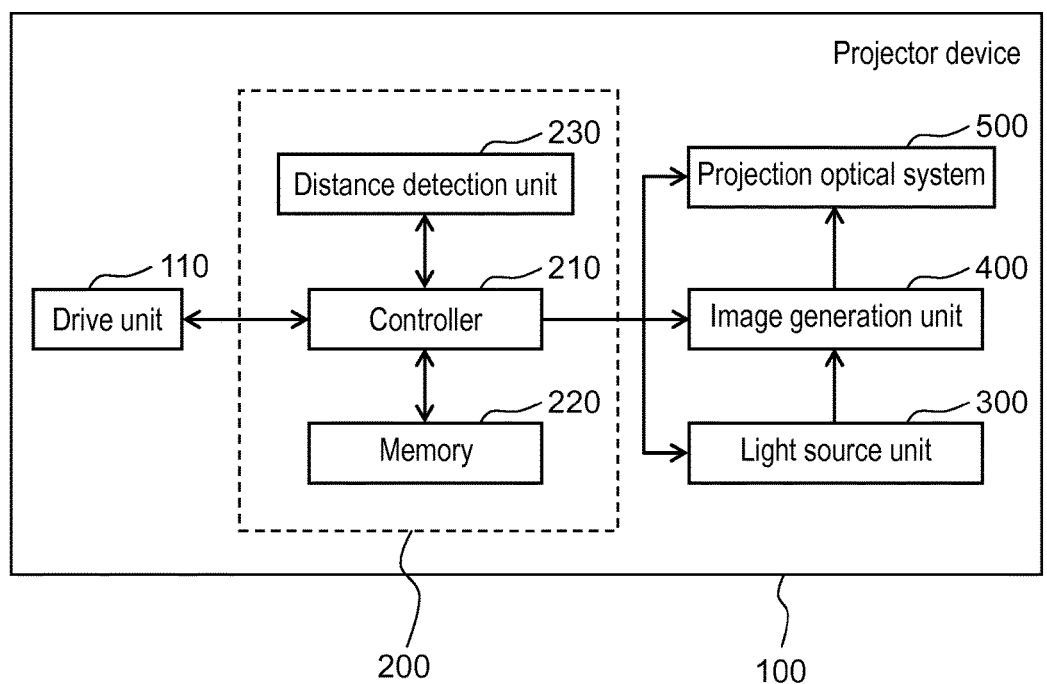
FIG. 3 is a block diagram illustrating an electrical configuration of the projector device.

FIG. 3 is a block diagram illustrating an electrical configuration of projector device 100. Projector device 100 includes drive controller 200, light source unit 300, image generation unit 400, and projection optical system 500. The configuration of each unit composing projector device 100 will sequentially be described below.

Drive controller 200 includes controller 210, memory 220, and distance detection unit 230.

Controller 210 is a semiconductor element that generally controls projector device 100. Specifically, controller 210 controls the operations of distance detection unit 230, memory 220, and the like composing drive controller 200, and the operations of light source unit 300, image generation unit 400, and projection optical system 500. Controller 210 can also perform a digital zoom control for zooming in or zooming out a projection image with a video signal process, or perform a geometric correction to the projection image in consideration of a direction of a projection plane. Controller 210 also controls drive unit 110 to change a projection direction or projection position of projection light from projector device 100. Controller 210 acquires, from drive unit 110, information relating to the current control position of drive unit 110 in a pan direction and a tilt direction, and information relating to a speed when drive unit 110 changes the direction of projector body 100b in the pan direction and the tilt direction. Controller 210 may be implemented only with hardware, or with a combination of hardware and software. For example, controller 210 can include one or more CPUs or MPUs.

Memory 220 is a memory element storing various information pieces. Memory 220 includes a flash memory or a ferroelectric memory. Memory 220 stores a control program and the like for controlling projector device 100. Memory 220 also stores various information pieces supplied from controller 210. Memory 220 also stores image data of a still image or a moving image which is to be projected, a reference table including settings such as a position on which an image is to be projected or a projection size, shape data of an object to be detected, and the like.

Distance detection unit 230 includes a distance image sensor of a TOF (Time-of-Flight) system (hereinafter referred to as a "TOF sensor"), for example. This sensor linearly detects a distance to a projection plane or an object which is opposite thereto. When facing wall 140, distance detection unit 230 detects a distance from distance detection unit 230 to wall 140. If a picture is on wall 140, distance detection unit 230 can detect the distance to the front surface of the picture. Similarly, when facing floor surface 150, distance detection unit 230 detects a distance from distance detection unit 230 to floor surface 150. If an object is placed on floor surface 150, distance detection unit 230 can detect the distance to the surface of the object.

Figure 4A:
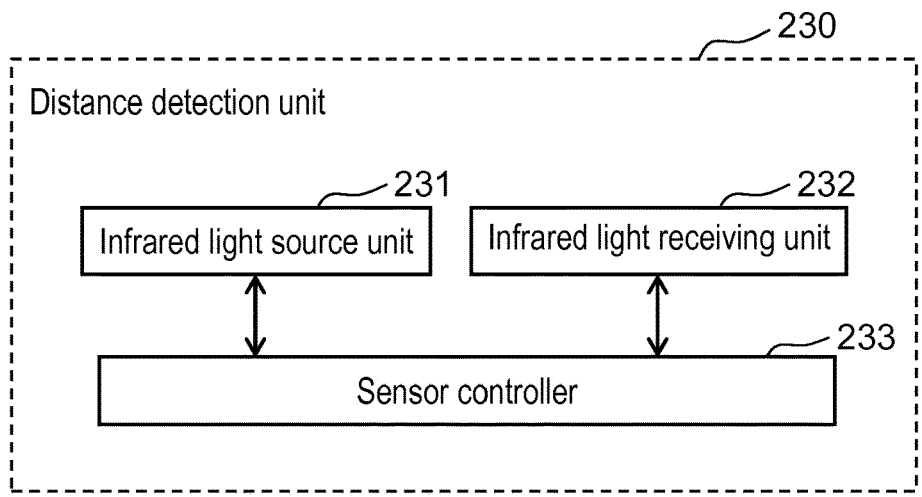
FIG. 4A is a block diagram illustrating an electrical configuration of a distance detection unit.

FIG. 4A is a block diagram illustrating the electrical configuration of distance detection unit 230. As illustrated in FIG. 4A, distance detection unit 230 includes infrared light source unit 231 that emits infrared detection light, infrared light receiving unit 232 that receives infrared detection light reflected on an opposed plane (or object), and sensor controller 233. Infrared light source unit 231 emits infrared detection light through opening 101 such that the infrared detection light is diffused completely around projector device 100. For example, infrared light source unit 231 uses infrared light with a wavelength of 850 nm to 950 nm as the infrared detection light. Controller 210 stores the phase of the infrared detection light emitted from infrared light source unit 231 in an internal memory. When the opposed plane is not equidistant from distance detection unit 230, and has a tilt or a shape, each of a plurality of pixels arrayed on the imaging plane of infrared light receiving unit 232 receives reflection light at different timings. Since each of the plurality of pixels receives reflection light at different timings, the infrared detection light received by infrared light receiving unit 232 has a different phase in each pixel. Sensor controller 233 stores the phase of the infrared detection light received by each pixel in infrared light receiving unit 232 in the memory.

Sensor controller 233 reads the phase of the infrared detection light emitted from infrared light source unit 231 and the phase of the infrared detection light received by each pixel in infrared light receiving unit 232 from the memory. Sensor controller 233 measures the distance to the opposed plane from distance detection unit 230 to generate distance information (distance image) based on the phase difference between the infrared detection light emitted from distance detection unit 230 and the received infrared detection light.

Figure 4B:
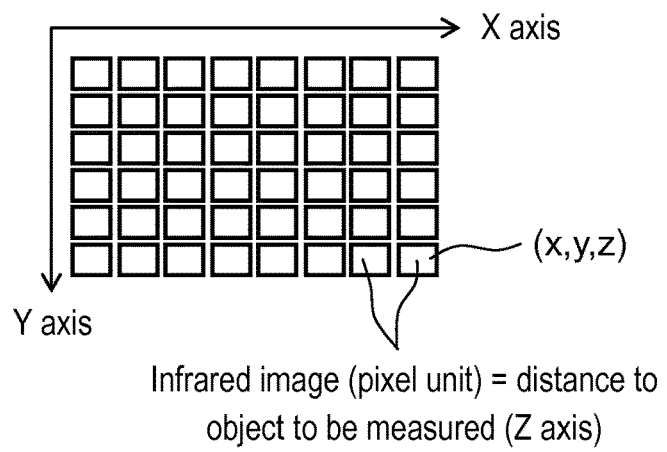
FIG. 4B is a diagram for describing distance information acquired by the distance detection unit.

FIG. 4B is a diagram for describing distance information generated by infrared light receiving unit 232 in distance detection unit 230. Distance detection unit 230 detects a distance to an object reflecting the infrared detection light based on the above phase difference for each of the pixels forming an infrared image with the received infrared detection light. With this, sensor controller 233 can acquire the detection result about the distance for the entire region of the angle of view of the infrared image received by distance detection unit 230 on a pixel basis. Controller 210 can acquire distance information from distance detection unit 230.

Controller 210 can detect a projection plane such as wall 140 or floor surface 150, or a specific object such as a person or an object, based on the distance information.

A TOF sensor is illustrated above as an example of distance detection unit 230. However, the present disclosure is not limited thereto. Specifically, distance detection unit 230 may be one that illuminates a known pattern such as a random dot pattern, and calculates distance based on deviation of the pattern, or may be one that utilizes disparity of a stereo camera. In addition, projector device 100 may have a RGB camera, not illustrated, in addition to distance detection unit 230. In such case, projector device 100 may detect an object by using image information output from the RGB camera as well as the distance information output from the TOF sensor. With use of the RGB camera, an object can be detected by using information such as a color of the object or characters written on the object as well as information about a three-dimensional shape of the object acquired from the distance information.

Figure 5:
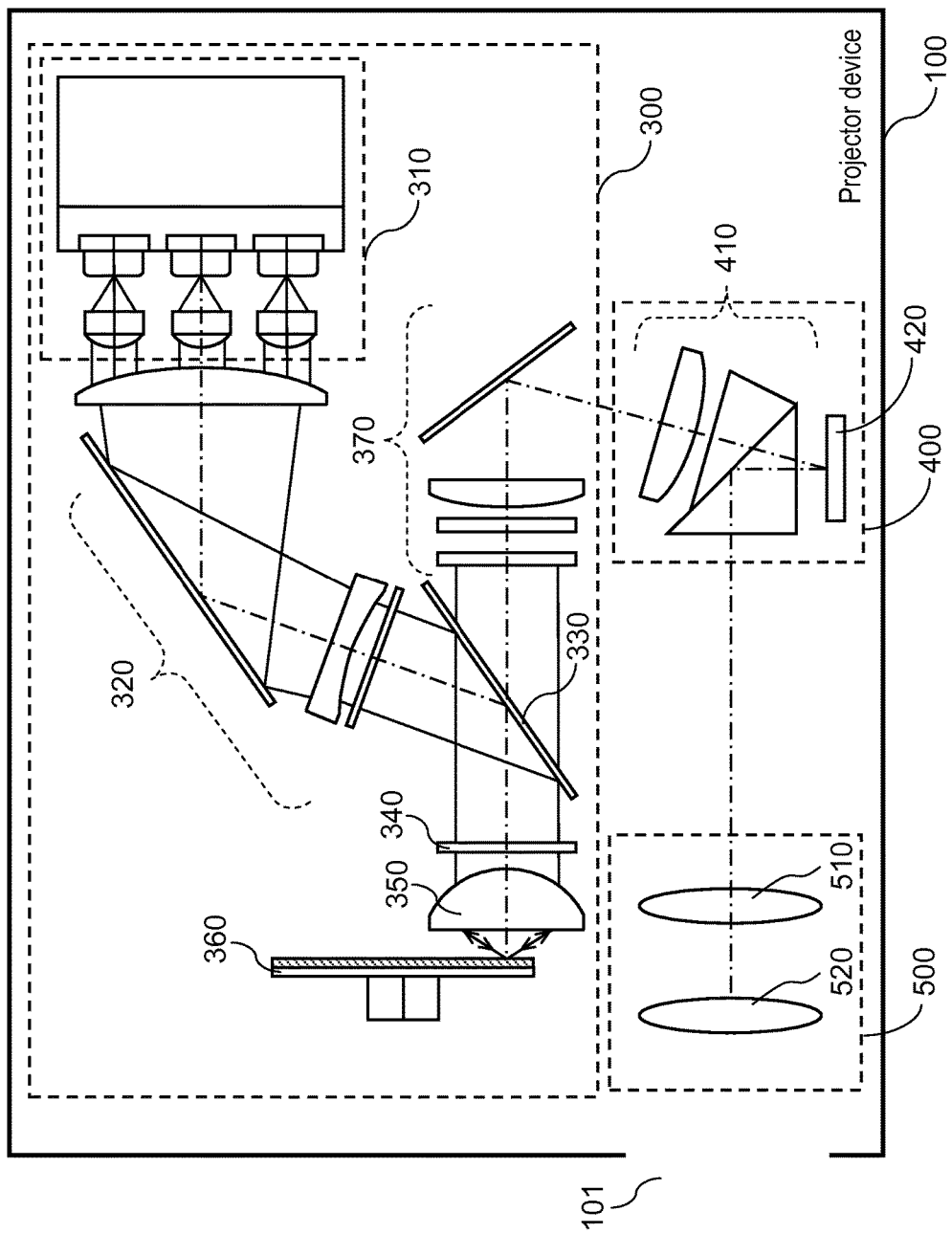
FIG. 5 is a block diagram illustrating an optical configuration of the projector device.

Next, an optical configuration of projector device 100 will be described. Specifically, the configurations of light source unit 300, image generation unit 400, and projection optical system 500 in projector device 100 will be described. FIG. 5 is a block diagram illustrating the optical configuration of projector device 100. As illustrated in FIG. 5, light source unit 300 supplies light necessary for generating a projection image to image generation unit 400. Image generation unit 400 supplies the generated image to projection optical system 500. Projection optical system 500 performs optical conversion, such as focusing or zooming, to the image supplied from image generation unit 400. Projection optical system 500 faces opening 101, and projects the image through opening 101.

The configuration of light source unit 300 will be described. As illustrated in FIG. 5, light source unit 300 includes semiconductor laser 310, dichroic mirror 330, λ/4 plate 340, phosphor wheel 360, and the like.

Semiconductor laser 310 is a solid light source that emits S polarized blue light with wavelength of 440 nm to 455 nm, for example. The S polarized blue light emitted from semiconductor laser 310 is incident on dichroic mirror 330 through light guide optical system 320.

For example, dichroic mirror 330 is an optical element having high reflectivity equal to or higher than 98% to the S polarized blue light with wavelength of 440 nm to 455 nm, and having high transmittance equal to or higher than 95% to P polarized blue light with wavelength of 440 nm to 455 nm and green light to red light with wavelength of 490 nm to 700 nm regardless of the polarization state. Dichroic mirror 330 reflects S polarized blue light emitted from semiconductor laser 310 toward λ/4 plate 340.

λ/4 plate 340 is a polarization element that converts linearly polarized light into circularly polarized light, or converts circularly polarized light into linearly polarized light. λ/4 plate 340 is disposed between dichroic mirror 330 and phosphor wheel 360. The S polarized blue light incident on λ/4 plate 340 is converted into circularly polarized blue light, and then, emitted to phosphor wheel 360 through lens 350.

Phosphor wheel 360 is an aluminum flat plate configured to be rotatable with high speed. A plurality of B regions which is a region of a diffusion reflection surface, a plurality of G regions on which a phosphor emitting green light is applied, and a plurality of R regions on which a phosphor emitting red light is applied are formed on the surface of phosphor wheel 360. Circularly polarized blue light emitted to B region of phosphor wheel 360 is diffused and reflected to be again incident on λ/4 plate 340 as circularly polarized blue light. The circularly polarized blue light incident on λ/4 plate 340 is converted into P polarized blue light, and then, enters again dichroic mirror 330. In this case, the blue light entering dichroic mirror 330 is P polarized light. Therefore, this blue light passes through dichroic mirror 330, and enters image generation unit 400 through light guide optical system 370.

Blue light or red light emitted to G region or R region of phosphor wheel 360 excites the phosphor applied on G region or R region to emit green light or red light. The green light or red light emitted from G region or R region is incident on dichroic mirror 330. In this case, the green light or red light entering dichroic mirror 330 passes through dichroic mirror 330, and enters image generation unit 400 through light guide optical system 370.

Since phosphor wheel 360 rotates with high speed, blue light, green light, and red light are emitted from light source unit 300 to image generation unit 400 in a time-shared manner.

Image generation unit 400 generates a projection image according to the video signal supplied from controller 210. Image generation unit 400 includes DMD (Digital-Mirror-Device) 420, and the like. DMD 420 is a display element having multiple micromirrors arrayed on a flat plane. DMD 420 deflects each of the arrayed micromirrors to spatially modulate the incident light according to the video signal supplied from controller 210. Light source unit 300 emits blue light, green light, and red light in a time-shared manner. DMD 420 sequentially and repeatedly receives blue light, green light, and red light, which are emitted through light guide optical system 410 in a time-shared manner. DMD 420 deflects each of the micromirrors in synchronization with the timing at which light of each color is emitted. Thus, image generation unit 400 generates a projection image according to the video signal. According to the video signal, DMD 420 deflects each of the micromirrors for light that directs to projection optical system 500 and light that directs to a region outside an effective range of projection optical system 500. With this, image generation unit 400 can supply the generated projection image to projection optical system 500.

Projection optical system 500 includes optical components such as zoom lens 510 and focusing lens 520. Projection optical system 500 enlarges the light incident from image generation unit 400, and projects this light onto the projection plane. Controller 210 adjusts the position of zoom lens 510, thereby being capable of controlling a projection region of an object to be projected to have a desired zoom value. To increase the zoom value, controller 210 moves zoom lens 510 to the direction in which the angle of view becomes narrow to reduce the projection region. On the other hand, to decrease the zoom value, controller 210 moves zoom lens 510 to the direction in which the angle of view becomes wide to increase the projection region. Controller 210 also adjusts the position of focusing lens 520 to follow the movement of zoom lens 510 based on predetermined zoom tracking data, thereby being capable of adjusting focus of the projection image.

The configuration of DLP (Digital-Light-Processing) system using DMD 420 has been described above as one example of projector device 100. However, the present disclosure is not limited thereto. Specifically, a configuration with a liquid crystal system may be used for projector device 100.

The configuration of a single plate type in which the light source using phosphor wheel 360 is time-shared has been described above as one example of projector device 100. However, the present disclosure is not limited thereto. Specifically, a configuration of a three plate type having light sources for blue light, green light, and red light may be used for projector device 100.

The configuration in which the light source for blue light for generating a projection image and the light source for infrared light for measuring a distance are different units has been described above. However, the present disclosure is not limited thereto. Specifically, the light source for blue light for generating a projection image and the light source for infrared light for measuring a distance may be combined into one unit. If a three plate type is used, the light source for each color and the light source for infrared light may be combined into one unit.

[1-3. Operation]

The operation of projector device 100 having the above configuration will be described below. Projector device 100 according to the present exemplary embodiment can detect a person as a specific object, and project a predetermined image at a position having a predetermined positional relation with the position of the person (e.g., the position 1 m ahead of the position of the detected person in the moving direction) by following the motion of the detected person.

Specifically, distance detection unit 230 emits infrared detection light toward a certain region (e.g., an entrance of a shop or building) to acquire distance information in this region. Controller 210 detects a person, and the position, moving direction, speed, and the like of the person, based on the distance information acquired by distance detection unit 230. Notably, the moving direction and speed are detected from distance information with a plurality of frames. Controller 210 determines the position on which the projection image is to be projected based on the position and moving direction of the detected person. Controller 210 moves projector body 100b in the pan direction or tilt direction by controlling drive unit 110 to project the projection image on the determined position. Controller 210 detects the position of the person at predetermined intervals (e.g., 1/60 second), and projects an image such that the projection image follows the person, based on the position of the detected person.

Figure 6:
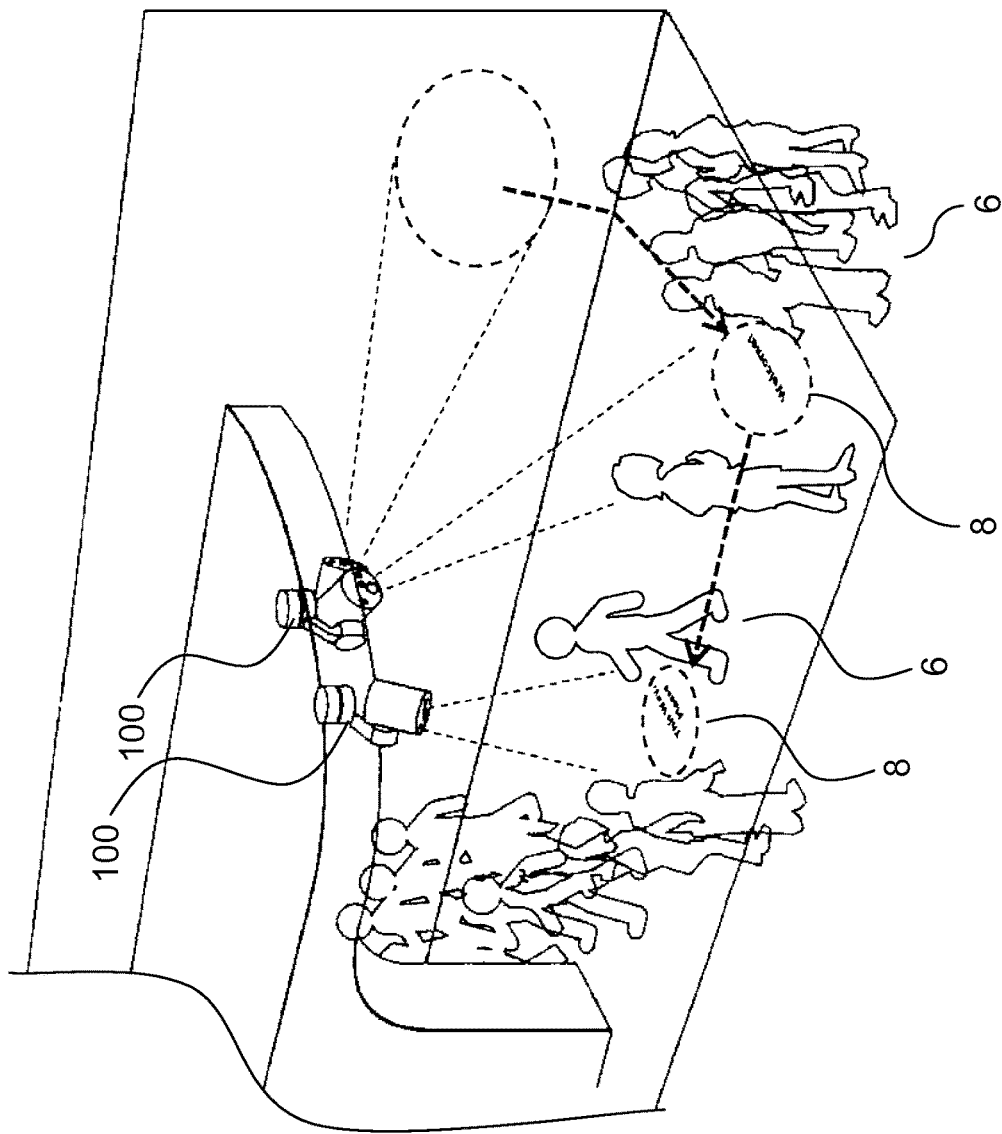
FIG. 6 is a diagram for describing an example of use of the projector device.

For example, projector device 100 is installed on a ceiling or wall of a passageway or hall in a building, and when detecting person 6, projector device 100 projects projection image 8 by following the motion of person 6 as illustrated in FIG. 6. For example, projection image (content image) 8 includes a graphic such as an arrow or a message for guiding or leading person 6 to a predetermined place or shop, a welcome message for person 6, an advertising text, and a graphic or image for creating an impressive presentation for a movement of person 6, such as a red carpet. Projection image 8 may be a still image or a moving image. With this configuration, projector device 100 can present desired information to detected person 6 at a position where person 6 can easily see the information according to the motion of detected person 6, thereby being capable of surely notifying person 6 of the desired information.

Projector device 100 according to the present exemplary embodiment also controls a projection position of an image according to contents of a content image indicated by a video signal, as well as the trajectory control of a projection image according to the person following control.

Specifically, projector device 100 controls a trajectory of drive unit 110 according to a frequency of a video signal, a motion of an object included in the image indicated by the video signal, and the like. For example, if the image indicated by the video signal is a fast-moving image, projector device 100 causes drive unit 110 to move fast. If the image indicated by the video signal is a slow-moving image, projector device 100 causes drive unit 110 to move slowly. Alternatively, projector device 100 causes drive unit 110 to move in the direction in which a person should be led according to contents of the video signal. If an image indicated by a video signal is a spinning image, projector device 100 may spin drive unit 110. If an image indicated by a video signal is an image in which a person walks to the right, projector device 100 may move drive unit 110 to the right.

Figure 7A:
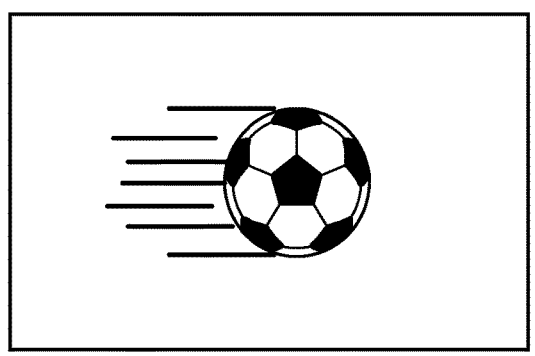
FIG. 7A is a diagram illustrating a fast-moving image.
Figure 7B:
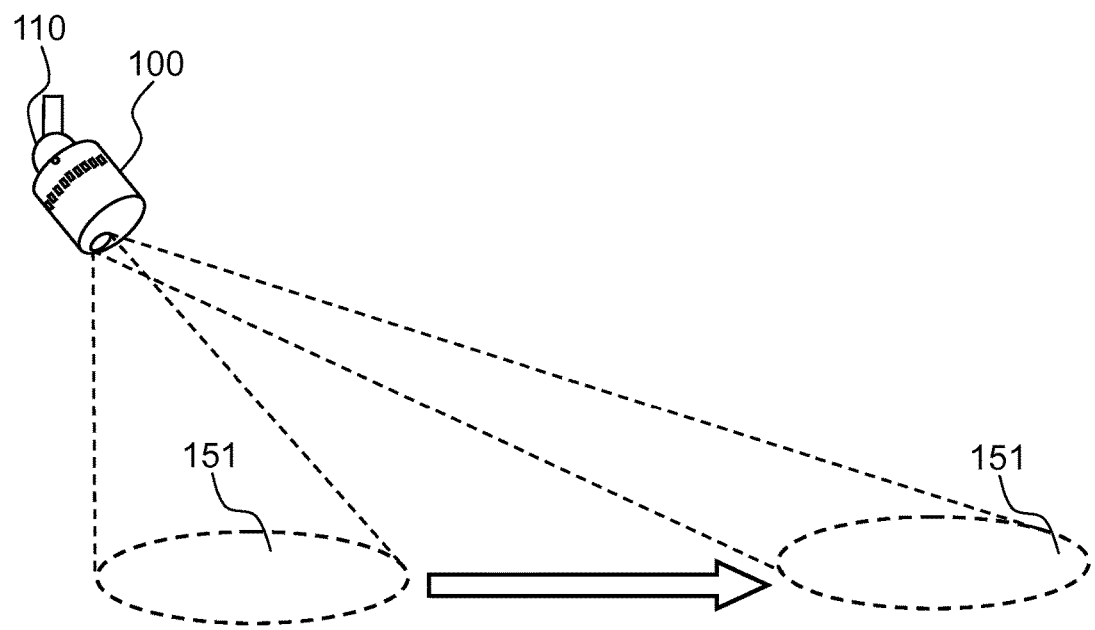
FIG. 7B is a diagram describing a motion of the drive unit that changes according to the fast-moving image.
Figure 8A:
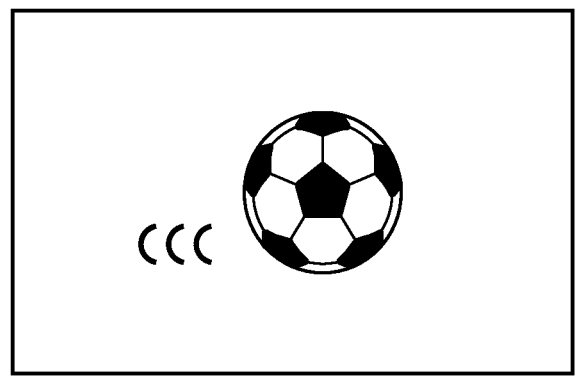
FIG. 8A is a diagram illustrating a slow-moving image.
Figure 8B:
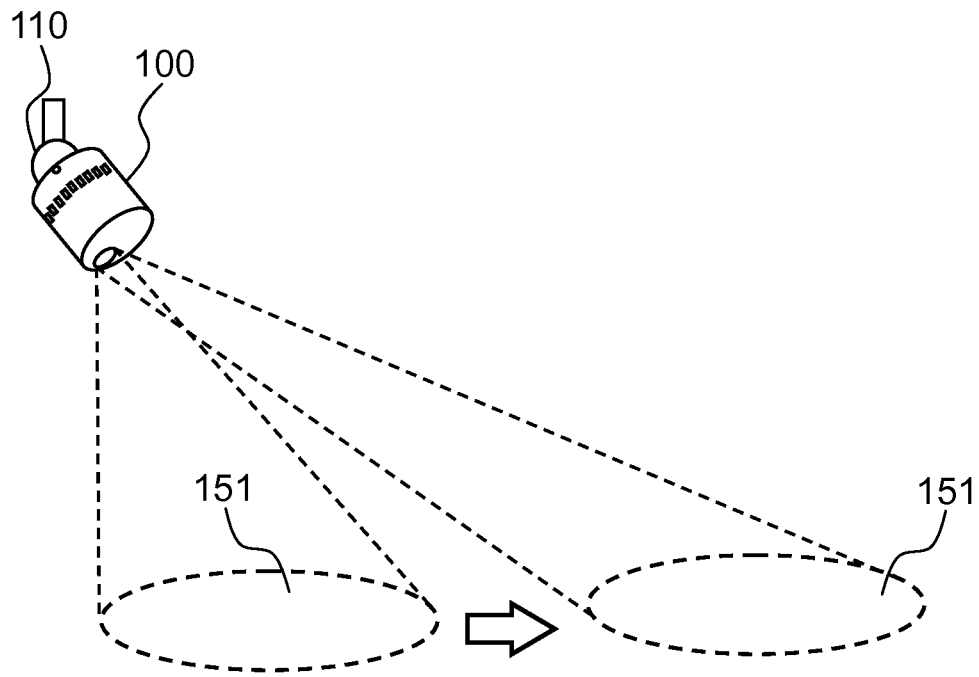
FIG. 8B is a diagram describing a motion of the drive unit that changes according to the slow-moving image.

For example, when a video signal indicates a soccer ball, and the motion of this soccer ball is fast as illustrated in FIG. 7A, controller 210 in projector device 100 causes drive unit 110 to move fast according to the fast motion of the soccer ball as illustrated in FIG. 7B. On the other hand, when a video signal indicates a soccer ball, and the motion of this soccer ball is slow as illustrated in FIG. 8A, controller 210 in projector device 100 causes drive unit 110 to move slowly according to the slow motion of the soccer ball as illustrated in FIG. 8B.

As described above, projector device 100 changes a driving method (i.e., a projection trajectory of an image) of drive unit 110 according to contents of a video signal. Specifically, projector device 100 according to the present exemplary embodiment adds a presentation operation (drive) to an operation (drive) with the person following control with respect to the drive of drive unit 110. The operation of projector device 100 will be described in detail below.

Figure 9:
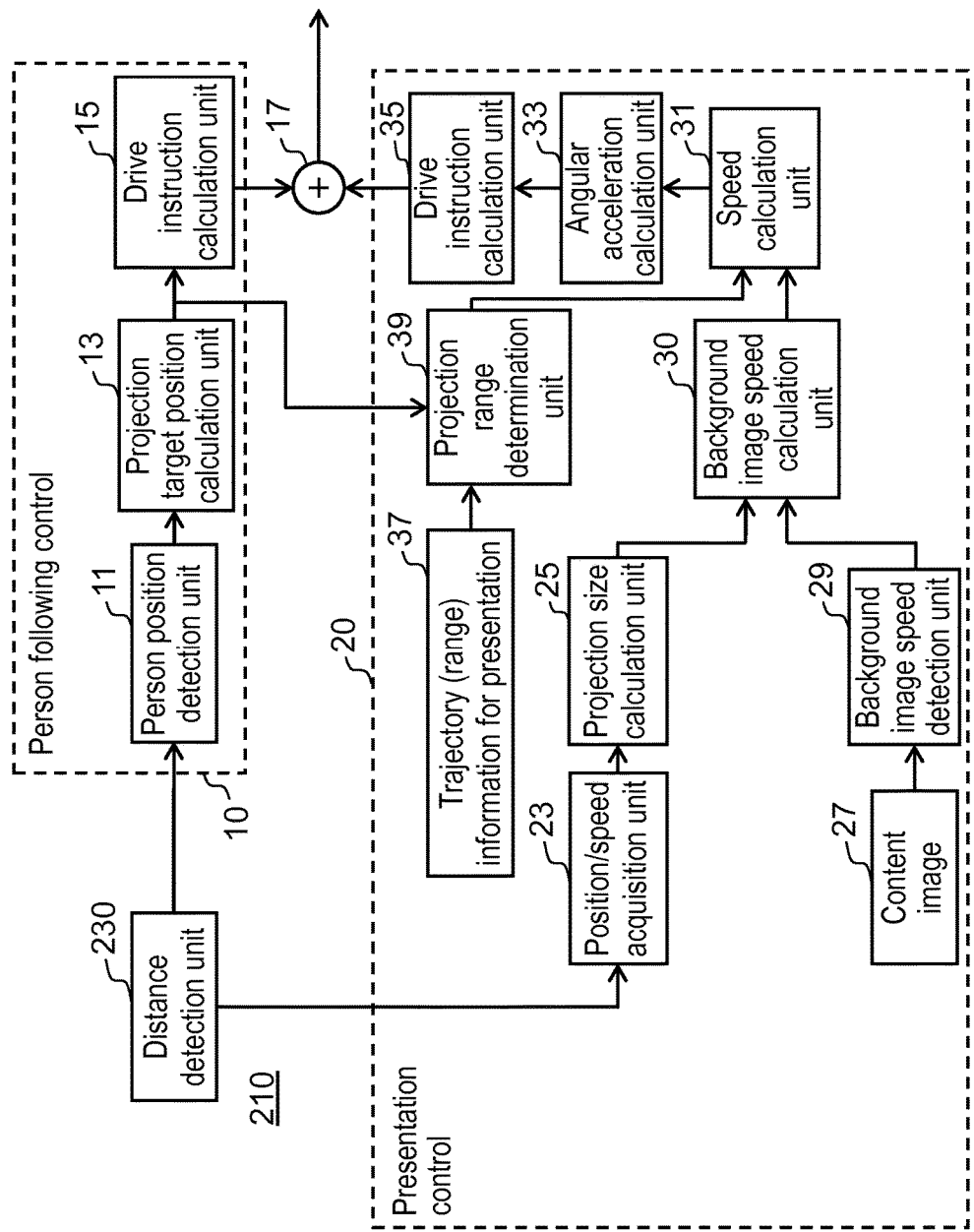
FIG. 9 is a block diagram illustrating a functional configuration of a controller of a projector device according to a first exemplary embodiment.

FIG. 9 is a diagram illustrating a functional configuration of controller 210. Controller 210 includes control block 10 performing the person following control, and control block 20 performing a control for the presentation operation. Controller 210 adds a drive instruction (voltage) generated by control block 10 and a drive instruction (voltage) generated by control block 20 at addition unit 17 to generate a final drive instruction (voltage). This drive instruction (voltage) is output to drive unit 110, by which drive unit 110 is controlled.

[1-3-1. Person Following Control]

Firstly, the operation of control block 10 generating the drive instruction for the person following control will be described. Note that a position and a speed are a two-dimensional vector having a size and a direction in the following description.

Person position detection unit 11 detects a person from distance information (distance image) from distance detection unit 230. A person is detected in such a manner that a characteristic amount indicating a person is stored beforehand in memory 220, and an object having this characteristic amount is detected from the distance information (distance image). Person position detection unit 11 also calculates a position of the detected person (relative position). The "relative position" here means a position on a coordinate system with the position of drive unit 110 being specified as a center. Projection target position calculation unit 13 calculates a target projection position (relative position) of a projection image with the position of the detected person being specified as a reference. For example, the position apart from the position of the detected person by a predetermined distance (e.g., 1 m) in the moving direction is calculated as the target projection position. Drive instruction calculation unit 15 calculates a drive instruction (voltage) for driving drive unit 110 so as to allow the direction of projector device 100 to match the direction in which the projection image from projector device 100 is projected on the target projection position (relative position).

[1-3-2. Drive Control for Presentation]

Next, the operation of control block 20 generating a drive instruction for presentation will be described. Position/speed acquisition unit 23 acquires distance information from distance detection unit 230, and calculates the projection position of the currently projected image based on the distance information.

Projection size calculation unit 25 acquires the position of the projection image from position/speed acquisition unit 23, and calculates a size of an object included in the image indicated by a video signal based on the acquired projection image. In order that the size of the object always becomes constant at the projected place, the size of the object in the video signal is set such that, the longer the distance to the projection position becomes, the smaller the size of the object becomes.

Background image speed detection unit 29 detects a speed of a background image, which is an image other than a main object included in content image 27 indicated by the video signal, from the content image 27. This speed is detected with a unit of pixel/s.

Background image speed calculation unit 30 calculates the speed (m/s) of the background image at the place where content image 27 is actually projected from the speed of the background image in content image 27 by using the image size calculated by projection size calculation unit 25.

Projector device 100 stores trajectory information 37 for presentation in memory 220. Trajectory information 37 for presentation is information showing a range of a trajectory on which drive unit 110 can move. Drive unit 110 cannot move (swing) beyond the range where drive unit 110 can move. Projection range determination unit 39 determines whether or not the projection target position calculated with the person following control is beyond the range where drive unit 110 can move, and outputs the determination result to speed calculation unit 31.

Speed calculation unit 31 calculates the moving speed of the projection image at the projection position based on the speed of the background image. Specifically, speed calculation unit 31 calculates the moving speed of the projection image at the projection position such that the background image looks as if it remains still. Specifically, speed calculation unit 31 calculates the speed (direction, size) in such a manner that the projection image moves in the direction opposite to the moving direction of the main object included in the projection image and with the speed equal to the speed of the background image. When receiving the determination result indicating that the projection target position is beyond the range where drive unit 110 can move from projection range determination unit 39, speed calculation unit 31 sets the moving speed of the projection image at the projection position to 0.

Angular acceleration calculation unit 33 calculates angular acceleration relating to the drive of drive unit 110 from the moving speed of the projection image calculated by speed calculation unit 31 at the projection position. Then, drive instruction calculation unit 35 calculates a drive instruction (voltage) for driving drive unit 110 based on the angular acceleration. In this way, the drive instruction relating to the drive of drive unit 110 for the presentation operation is calculated by control block 20.

Addition unit 17 adds the drive instruction (voltage) generated by control block 10 for the person following control and the drive instruction (voltage) generated by control block 20 for the presentation operation to generate a drive instruction (voltage) to drive unit 110, and outputs this drive instruction. Drive unit 110 swings in the pan direction or tilt direction based on the drive instruction (voltage).

As described above, with projector device 100 according to the present exemplary embodiment, a speed for presentation according to contents of a video signal is added to a drive speed of an image determined by the person following control. Thus, projector device 100 can project a projection image with a presentation effect, while projecting the projection image by following a person.

[1-4. Effect, Etc.]

As described above, projector device 100 according to the present exemplary embodiment includes: person position detection unit 11 configured to detect a person (one example of a specific object); a projection unit (image generation unit 400 and projection optical system 500) configured to project a projection image indicated by a video signal; drive unit 110 configured to change the direction of the projection unit so as to change a projection position of the projection image; and controller 210 configured to control drive unit 110 to perform a first control (control block 10) in which the projection image is projected at a position following the motion of the person detected by person detection unit 11 and a second control (control block 20) in which the projection position of the projection image is changed according to the video signal.

With the above configuration, not only the trajectory for the person following but also the trajectory of a projection image (trajectory of drive unit 110 according to contents of an image to be projected) can be changed, whereby an impressive image for a person watching this image can be presented. Accordingly, leading a person, guiding a person, or an advertisement can effectively be performed for a desired place, shop, and the like.

Second Exemplary Embodiment

Figure 10:
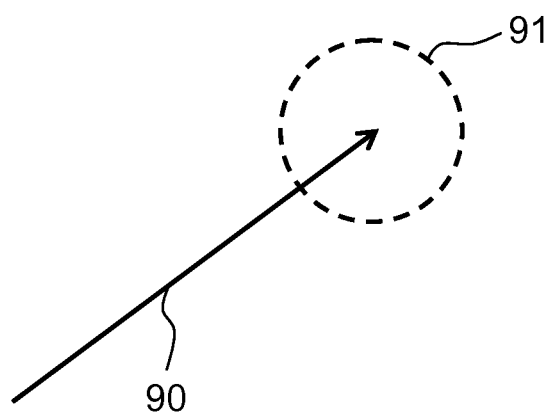
FIG. 10 is a diagram describing a trajectory of a projection image added for presentation according to a second exemplary embodiment.

Another example of the presentation control according to contents of a video signal will be described. In the present exemplary embodiment, as illustrated in FIG. 10, a predetermined trajectory (e.g., a circular trajectory) 91 for presentation is formed in addition to trajectory 90 for the person following control, with respect to a trajectory of a projection image. In addition, a moving speed of a projection image at a projection position is controlled according to a temporal variation (frequency) of a video signal.

The configuration of a projector device according to the present exemplary embodiment is basically similar to the configuration of the projector device in the first exemplary embodiment described with reference to FIGS. 1 to 5 except for the function and operation of controller 210.

Figure 11:
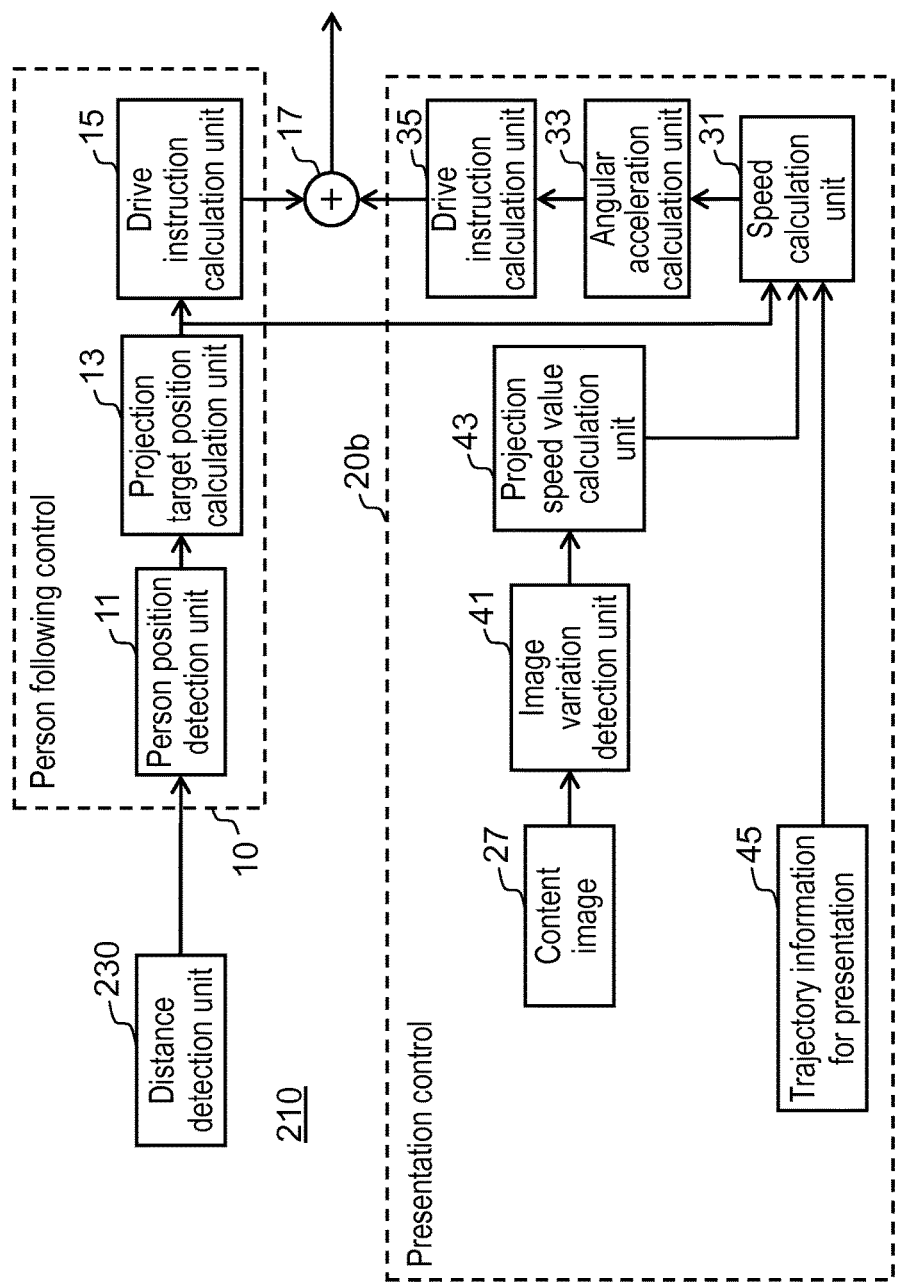
FIG. 11 is a block diagram illustrating a functional configuration of a controller of a projector device according to a second exemplary embodiment.

The specific operation of controller 210 in the present exemplary embodiment will be described with reference to FIG. 11. FIG. 11 is a diagram illustrating a functional configuration of controller 210 in the present exemplary embodiment. The operation of control block 10 performing the person following control is similar to that described above. An operation of control block 20b performing the presentation control will be described below.

Image variation detection unit 41 detects a temporal variation (frequency) of an image from content image 27 indicated by a video signal.

Projection speed value calculation unit 43 determines an absolute value of a moving speed of a projection image at a projection position upon projecting the projection image according to the temporal variation. Specifically, projection speed value calculation unit 43 sets the absolute value of the moving speed of the projection image at a projection position to be larger, as the temporal variation (frequency) is higher. With this, if an image indicated by a video signal is a rapidly changing image, a projection image is moved fast, and if an image indicated by a video signal is a slowly changing image, a projection image is moved slowly. However, when a temporal variation of an image exceeds a predetermined threshold value (upper limit value), the moving speed of the projection image at the projection position is limited to be not more than the upper limit value. This is because, when a temporal variation (frequency) of an image is large, visibility is deteriorated upon moving the image fast.

Trajectory information 45 for presentation is information indicating a trajectory for presentation for a projection image, and includes information indicating trajectory 91 illustrated in FIG. 10, for example. Trajectory information 45 for presentation is stored in memory 220.

Speed calculation unit 31 acquires the projection target position acquired with the person following control, the absolute value of the speed acquired by projection speed value calculation unit 43, and trajectory information 45 for presentation, and calculates the speed with which the projection image is moved on a floor surface or a wall surface, for example, based on these information pieces.

Angular acceleration calculation unit 33 calculates angular acceleration relating to the drive of drive unit 110 from the speed of the projection image calculated by speed calculation unit 31. Drive instruction calculation unit 35 calculates a drive instruction (voltage) for driving drive unit 110 based on the angular acceleration calculated by angular acceleration calculation unit 33. In this way, the drive instruction relating to the drive of drive unit 110 for the presentation operation is calculated by control block 20*b*.

The drive instruction generated by control block 10 and the drive instruction generated by control block 20 are added by addition unit 17, and the resultant is output to drive unit 110 to control drive unit 110.

As described above, according to the control in the present exemplary embodiment, trajectory 91 for presentation can be added to trajectory 90 for the person following control with respect to a projection trajectory of a projection image. According to the control in the present exemplary embodiment, a temporal variation of an image is detected, and when the variation is large, a motion speed (absolute value) of an image for presentation is decreased. With this, deterioration in visibility due to the change in the projection position with the motion of the projection image can be reduced for a rapidly changing image with time.

In the above example, a moving speed of an image according to the presentation control is set based on a temporal variation of the image. However, a speed of an image according to the presentation control may be set based on a spatial frequency of the image instead of or in addition to the temporal variation of the image. For example, a moving speed of an image according to the presentation control may be set to be larger, as the spatial frequency is higher.

In the above example, a circular trajectory is used as the trajectory for presentation. However, the shape of the trajectory is not limited thereto. For example, the shape of the trajectory for presentation may be a figure of eight.

In addition, memory 220 stores two or more types of trajectory information pieces as trajectory 45 for presentation, and one of the trajectory information pieces of two or more types may be selected according to contents of a projection image. For example, one trajectory information may be selected based on a frequency of an image, brightness of a video signal, a motion of an object, an object shape, or the like, and the selected information may be added to a trajectory for a person following control.

Third Exemplary Embodiment

Projector device 100 according to the present exemplary embodiment projects a projection image to be closer to a person, which is an object to be followed by the projection image, when the person becomes close to a predetermined position. With this, attention of a person who is expected to see a projection image can be focused on this projection image, and information relating to the position can surely be transmitted.

The configuration of a projector device according to the present exemplary embodiment is basically similar to the configuration of the projector device in the first and second exemplary embodiments described with reference to FIGS. 1 to 5 except for the function and operation of controller 210.

Figure 12:
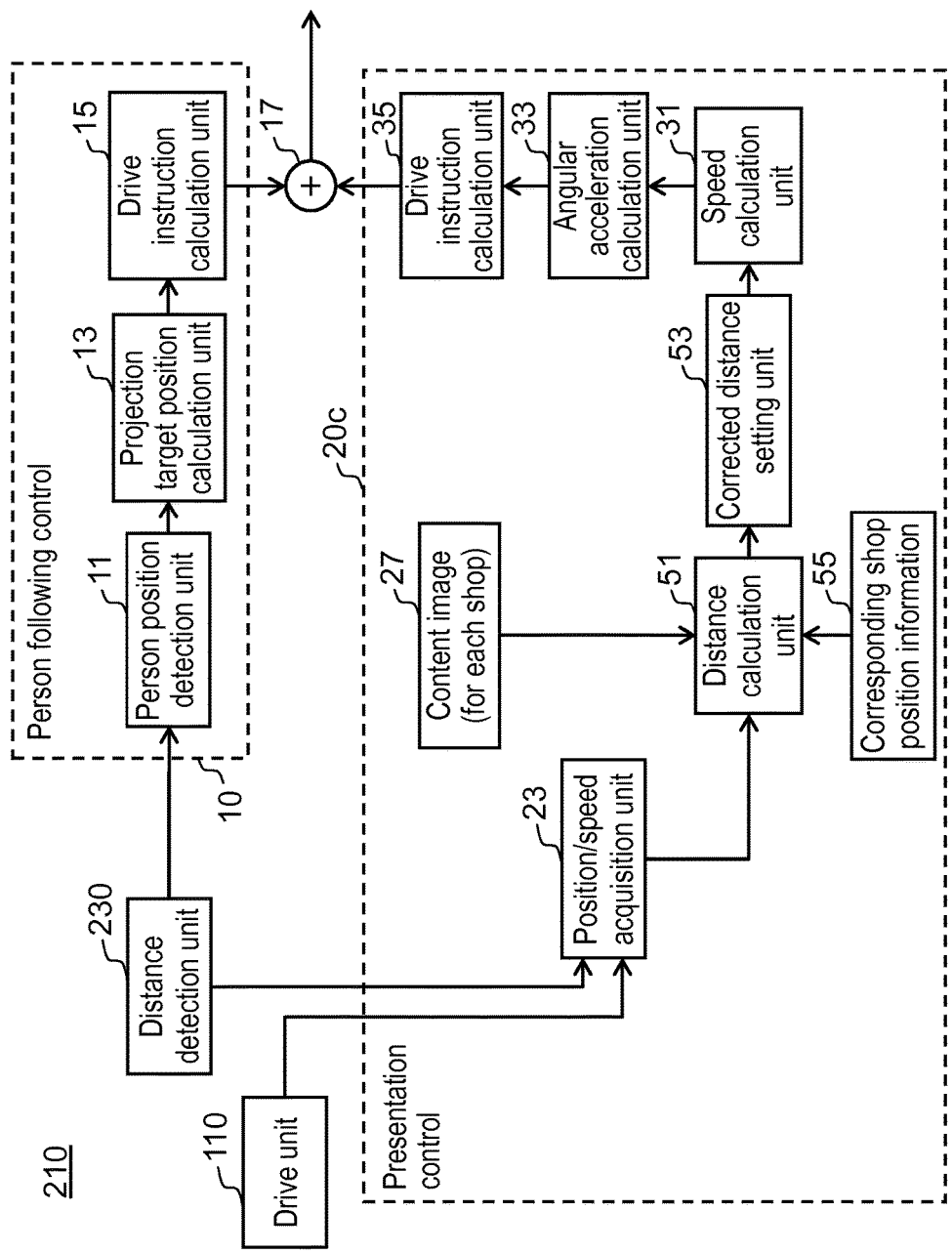
FIG. 12 is a block diagram illustrating a functional configuration of a controller of a projector device according to a third exemplary embodiment.

The specific operation of controller 210 in the present exemplary embodiment will be described with reference to FIG. 12. FIG. 12 is a diagram illustrating a functional configuration of controller 210 in the present exemplary embodiment. The operation of control block 10 performing the person following control is similar to that described above. An operation of control block 20*c* performing the presentation control will be described below.

Content image 27 includes an image created for advertisement of a shop for each shop. Content image 27 includes advertising images for two or more shops, and is configured to switch and display an image of the shop for each shop.

Corresponding shop position information 55 stores position information of each shop (e.g., position information of a storefront of each shop) included in the content image. Corresponding shop position information 55 is stored in memory 220.

Position/speed acquisition unit 23 acquires distance information from distance detection unit 230. Position/speed acquisition unit 23 also acquires information relating to the position (position in the pan/tilt direction) and the drive speed of drive unit 110 from drive unit 110. Position/speed acquisition unit 23 calculates the current projection position and the moving speed of the projection image based on the information pieces respectively acquired from distance detection unit 230 and drive unit 110.

Distance calculation unit 51 calculates the distance between the current projection position of the projection image (in other words, the position of the person that is to be followed by the projection image) and the position of the shop corresponding to the content image 27. Specifically, distance calculation unit 51 specifies the corresponding shop from content image 27, and acquires the position of the specified shop by referring to corresponding shop position information 55. Distance calculation unit 51 calculates distance between the current projection position of the projection image and the position of the specified shop.

Corrected distance setting unit 53 determines whether the current projection position of the projection image is within a predetermined range from the specified shop or not based on the current projection position of the projection image calculated by distance calculation unit 51 and the position of the specified shop. The "predetermined range" here means a range by which a person is determined to be close to a shop, and it is set within radius of 2 m to 3 m from the position of the specified shop, for example.

When determining that the current projection position of the projection image is outside the predetermined range from the specified shop, corrected distance setting unit 53 sets a correction value of the distance between the person followed by the projection image and the projection image to 0. On the other hand, when determining that the current projection position of the projection image is within the predetermined range from the specified shop, corrected distance setting unit 53 sets a correction value of the distance such that the distance between the person followed by the projection image and the projection image becomes smaller than a predetermined distance (e.g., 1 m) set in the person following control. Corrected distance setting unit 53 then sets a corrected position (relative position with the position of the person being defined as a reference) of the projection image based on the corrected distance value. Specifically, the corrected position (relative position) of the projection image is set such that the projection image is projected at the position closer to the person with a distance smaller than the predetermined distance set in the person following control. The corrected position is output to speed calculation unit 31.

Thereafter, drive instructions with the presentation control are acquired by speed calculation unit 31, angular acceleration calculation unit 33, and drive instruction calculation unit 35. The drive instruction with the person following control and the drive instruction with the presentation control are added by addition unit 17, and the resultant is output to drive unit 110.

With the above control, when a person who is expected to receive information moves close to a shop corresponding to a content image to be projected, the image can be projected by reducing the distance between the projection image and the person who is expected to receive information. Since the projection image is projected closer to the person who is expected to receive information, the person who is expected to receive information is easy to direct his/her attention to the projection image, whereby an announcement of the existence of the shop, guidance to the shop, and advertisement can effectively be performed.

Other Exemplary Embodiments

As described above, the first to third exemplary embodiments have been described above as an illustration of the technique disclosed in the present application. However, the technique in the present disclosure is not limited to these, and can be applied to exemplary embodiments in which various changes, replacements, additions, omissions, etc., are made. Furthermore, a new exemplary embodiment can be formed by combining each component described in the first to third exemplary embodiments. The other exemplary embodiments will be described below.

(1) Projector device 100 according to the present disclosure is one example of a projection device. Person position detection unit 11 according to the present disclosure is one example of a detection unit that detects a specific object. Image generation unit 400 and projection optical system 500 according to the present disclosure are one example of a projection unit. Drive unit 110 according to the present disclosure is one example of a drive unit that changes the direction of the projection unit. Controller 210 according to the present disclosure is one example of a controller that controls the drive unit.

(2) In the above exemplary embodiments, a moving speed of a projection image at a projection position in a presentation control is determined based on a speed of a main object (i.e., a background image) in an image or a frequency of the image. However, the moving speed may be determined based on other attributes of an image. For example, a moving speed of a projection image at a projection position in the presentation control may be controlled based on brightness of a video signal. A moving speed of a projection image at a projection position in the presentation control may be set to be higher, as brightness of a video signal is higher in a "bright scene" or "dark scene", for example. Alternatively, a moving speed of a projection image at a projection position in the presentation control may be set to be lower, as brightness variation of a video signal is large. This is because visibility is deteriorated when brightness variation of a video signal is large and a speed of a projection image is high.

(3) In the first and second exemplary embodiments, a moving speed of a projection image at a projection position in the presentation control is set to be higher, as a speed or temporal variation (frequency) of an object in an image is higher. However, if importance is placed on securing visibility, a moving speed of a projection image at a projection position in the presentation control may be set to be lower, as a speed or temporal variation (frequency) of an object in an image is higher. The reason of this setting is to avoid deterioration in visibility due to more than necessary speed caused by the addition of the speed of the object in the image and the moving speed of the projection image.

(4) In the above exemplary embodiments, a person is detected as a specific object, and displays a predetermined image (contents) by following a motion of the person. However, the specific object is not limited to a person. For example, the specific object may be a moving subject other than a person, such as an automobile or animal.

(5) In the above exemplary embodiments, distance information is used for detecting a specific object. However, the method of detecting the specific object is not limited thereto. An imaging device that can pick up an image with RGB light may be used instead of distance detection unit 230. A specific object may be detected from the image picked up by the imaging device, and the position and speed of the specific object may further be detected.

(6) The techniques disclosed in the above first to third exemplary embodiments can appropriately be combined to one another.

The exemplary embodiments have been described above as illustrative examples of the technique in the present disclosure. The accompanying drawings and the detailed description are provided for this purpose.

Thus, elements appearing in the accompanying drawings and the detailed description include not only those that are essential, but also those that are not essential but are merely used to illustrate the technique disclosed herein. Therefore, those non-essential elements should not immediately be taken as being essential for the reason that they appear in the accompanying drawings and/or in the detailed description.

The exemplary embodiments above are for illustrating the technique disclosed herein, and various changes, replacements, additions, omissions, etc., can be made without departing from the scope defined by the claims and equivalents thereto.

The projection device according to the present disclosure is applicable to various uses for projecting an image onto a projection plane.

What is claimed is:

1. A projection device comprising:
a detection unit configured to detect a specific object;
a projection unit configured to project a projection image based on content of a video signal;
a drive unit configured to change a direction of the projection unit so as to change a projection position of the projection image; and
a controller configured to control the drive unit such that the drive unit performs a first control in which the projection image is projected at a position following a motion of the specific object detected by the detection unit, wherein
the detection of the specific object by the detection unit includes detecting a moving speed and a moving direction of the specific object, and
in the first control, the controller controls the drive unit to change a distance between the projection image and the specific object from a first distance to a second distance according to the moving speed and the moving direction detected,
wherein the second distance is shorter than the first distance, and the projection image being projected does not overlap the specific object.

2. The projection device according to claim 1, wherein the controller increases the moving speed of the projection image at a projection position, as the motion of the image becomes faster in the content of the video signal.

3. The projection device according to claim 1, wherein, when the projection image is projected within a predetermined range from a position corresponding to the image in the content of the video signal, the controller controls the drive unit such that the projection image is projected at a position closer to the specific object, compared to a case where the projection image is projected outside the predetermined range.

4. The projection device according to claim 1, wherein the specific object is not included in the content of the video signal.

5. The projection device according to claim 1, wherein the image is a main or a background image included in the content of the video signal.

6. The projection device according to claim 1, wherein an absolute value of the moving speed of the projection image is set to increase with an increase in a temporal variation of the image in the content of the video signal.

7. The projection device according to claim 1, wherein the controller is further configured to control the drive unit such that the drive unit performs a second control for controlling a moving speed of the projection image at the projection position according to content of the video signal.

8. The projection device according to claim 7, wherein the controller controls adding a drive instruction of the first control and a drive instruction of the second control.

9. The projection device according to claim 7, wherein the content includes a first object and a second object, and in the second control, the controller controls the drive unit to change the moving speed of the projection image at the projection position according to a motion of the first object with respect to the second object in the content.

10. The projection device according to claim 7, wherein the controller is configured to control the drive unit such that the drive unit performs the second control for controlling the moving speed of the projection image at the projection position according to motion of the content of the video signal.

* * * * *